United States Patent

[11] 3,601,386

| [72] | Inventor | John W. Estep |
| | | Box 685, Ferndale, Wash. 98248 |
| [21] | Appl. No. | 857,722 |
| [22] | Filed | Sept. 15, 1969 |
| [45] | Patented | Aug. 24, 1971 |

[54] JIG FOR POSITIONING ELECTRICAL BOXES
5 Claims, 6 Drawing Figs.

[52] U.S. Cl. ................................................... 269/6,
81/5.1, 81/420
[51] Int. Cl. ..................................................... B25b 3/00
[50] Field of Search ........................................ 269/1, 2, 3,
6; 81/5.1, 415, 418, 420, 425, 424

[56] References Cited
UNITED STATES PATENTS
| 278,262 | 5/1883 | Olson .......................... | 81/418 X |
| 1,109,952 | 9/1914 | Armstrong ................... | 269/2 |
| 1,321,208 | 11/1919 | Hinnershitz ................. | 81/424 X |
| 3,263,535 | 8/1966 | Zurcher ........................ | 81/424 X |

*Primary Examiner*—Andrew R. Juhasz
*Assistant Examiner*—James F. Coan
*Attorney*—Clinton L. Mathis ABSTRACT: The edge of an electrical junction box is inserted an adjustable amount between two plates movable toward and away from each other by suitable means, as tongs. This adjusted amount is the amount allowed for the thickness of a wall to be later constructed and to the surface of which, the edge of the electrical box should project. An adjustable rod determines the selected elevation of the box. While the box is being secured to a stud, the jig permits the box to be manually held in the selected position for installation.

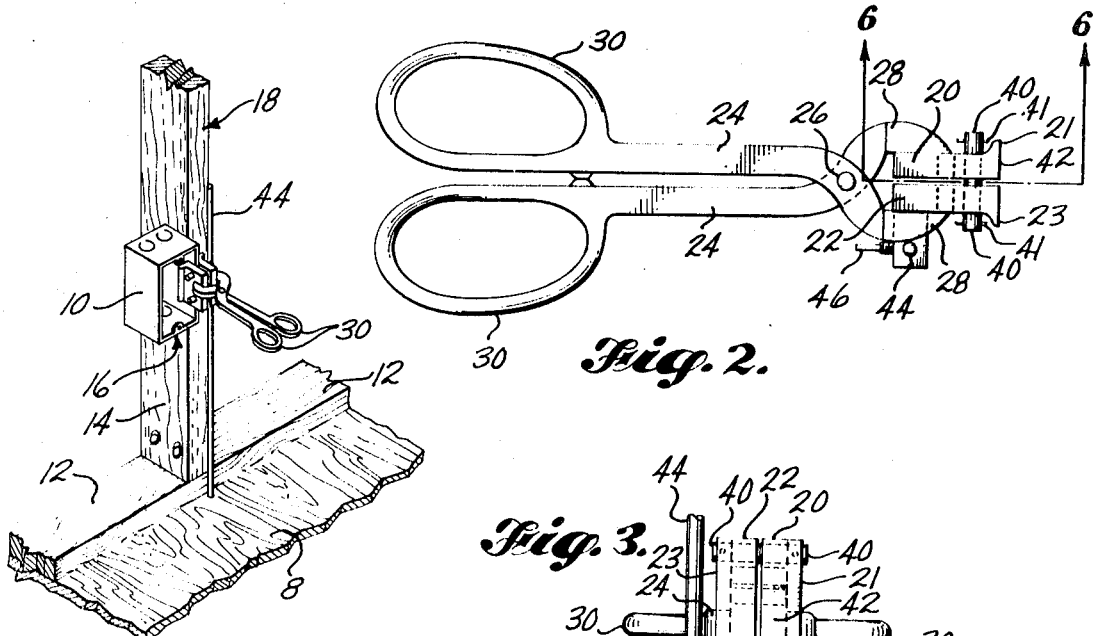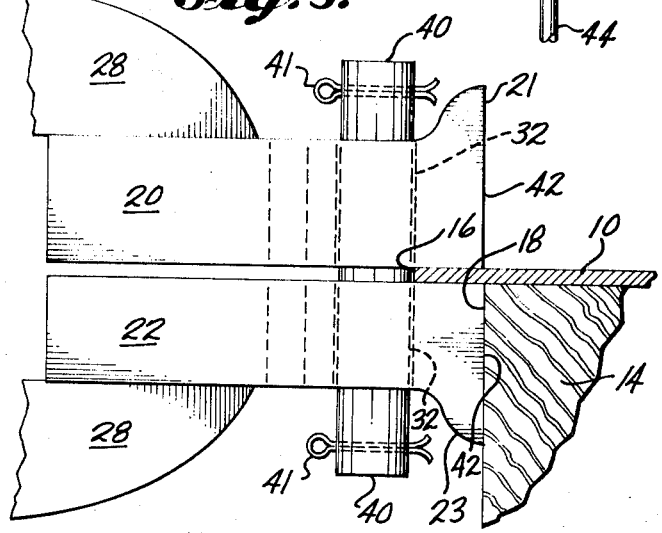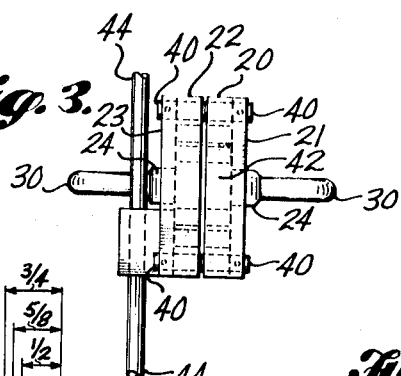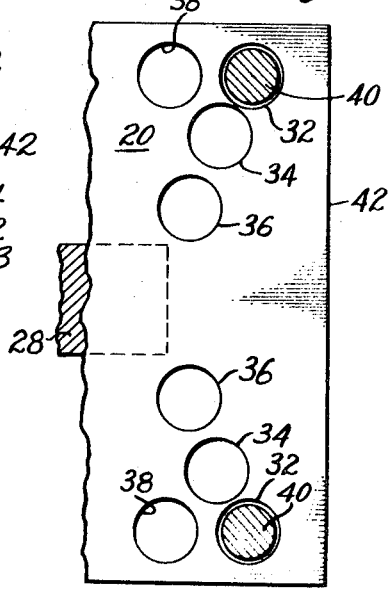
INVENTOR:
JOHN W. ESTEP
BY
Clinton L. Mathis
ATTORNEY

JIG FOR POSITIONING ELECTRICAL BOXES

My invention relates to a jig for positioning electrical boxes relative to a building stud, both as to the extend of forward projection past said stud and as to the elevation above the bottom of said stud, and to the holding of such a box in such a position, while the box is being permanently secured in place, such as by nailing.

In the installation of electrical wiring on new constructions, the electrical work is done when the wall frames, as studs, are in place and before the wall surfaces are installed. The wall surfaces or the wall per se may be formed of various materials and of various thicknesses, such as plywood or plyboard, or similar surfaces, either alone or in combination with heat insulation materials, or lath and plaster construction, or many others. The end results are that the thickness of the wall surfacing material will vary over a rather substantial range. Thus, when the electrician installs electrical junction boxes, for mounting such electrical items as outlet plugs, fixtures, and the like, he must allow for different projections of the edges of the boxes past the studs and select an amount determined by the thickness of the wall to be later constructed against such studs. Also, it is desirable to have the outer edges of the said electrical boxes flush with a particular wall so that the surface plate fits metal to metal and thus all of the electrical service entering the junction box are enclosed within said box. The various electrical boxes at a given construction and eventually the plates which cover the same should be at a common elevation in the interest of eye appeal and good workmanship and particularly so as to the boxes in a given room.

It is an object of my invention to provide a jig which takes into consideration the foregoing and provides for a jig having a manually operable pair of tongs carrying two plates movable toward and away from each other. The jaws of said two plates are adapted to receive therebetween, a sidewall of an electrical box. Stop means are provided to limit the projection of such a sidewall of an electrical box to adjusted amounts and which adjusted amounts are the adjusted amounts it is desired to project the front edges of a box beyond a stud to allow for a particular wall to be later erected against such studs.

It is a further object to provide a device which will also determine the elevation of a box and which device will hold the box while it is being permanently secured to the studs, as by nailing.

Other objects of my invention will become explicit or implicit as the description of the invention proceeds in connection with the accompanying drawing, wherein like reference numerals indicate like parts and wherein:

FIG. 1 is a perspective view of a device embodying my invention shown in connection with the fragments of a floor plate, a subfloor, and a stud, and with an electrical junction box being positioned in place relative to a stud;

FIG. 2 is a plan view, on a larger scale, of the device shown in FIG. 1;

FIG. 3 is an end elevation of said device;

FIG. 4 is a side elevation of said device;

FIG. 5 is a fragmentary elevational view, on a larger scale, showing the end portion of said device, a fragment of an electrical junction, and a fragment of a stud; and FIG. 6 is an enlarged fragmentary view taken substantially on broken line 6—6 of FIG. 2.

Referring to FIG. 1 of the drawings, a typical installation of an electric junction box is illustrated. Here a horizontal floor plate 12, a subfloor 8, and a vertical stud 14 are fragmentarily illustrated. As is common, the box 10 is to be mounted on a side of the stud 14, such as the left side thereof. It is highly desirable (although often either overlooked or not accomplished because of the lack of proper tools) to mount each box 10 in a given house at the same elevation. By having a common elevation, then electrical fixtures, as outlet receptacles, will have that uniformity of appearance common to superior workmanship. Also, it is desired that the forward edge portions 16 of the box 10 extend forwardly of the front surface 18 of said stud 14 an amount to allow for the surface thickness of the wall to be formed against the front of said stud 14. The electrician does his work, such as installing his wiring, outlet boxes, and the like, in new buildings after the studs and skeleton framework of the house have been completed and before the walls are formed adjacent the studs. Thus, the electrical work in a house at the wall area is within the wall and projects outwardly therefrom at the location of junction boxes, such as boxes 10. As previously indicated, the thicknesses of walls will vary with the type of construction and materials employed. Regardless of the type of construction, it is highly desirable to have the forward edge portions 16 of the boxes 10 to project forward of the front surface 18 of the studs 14 a definite and precise amount determined by the thickness of the walls to be formed adjacent the front surface 18 of a stud 14. By allowing precisely for the thickness of the wall to be formed, then the cover plate to be secured to the box 10 will fit tightly thereagainst and a box will be sealed as desired and without a spacing between the forward surface edge portions of the box 10 and any covering plate.

The jig of my invention includes plates 20 and 22. The plates 20 and 22 have, respectively, enlarged front areas 21 and 23. Thus an enlarged area may be placed in contacting relation with the front surface 18 of a stud 14 regardless of the side of the stud against which a box 10 may be mounted, e.g., right or left of stud 14 of FIG. 1. The said plates 20 and 22 are carried by a tongs comprising legs 24 pivoted together by pin means 26. The leg portions 24 terminate, at one end portion thereof, in a pair of jaws 28. To one of the jaws 28 is secured a plate 20 and to the other thereof is secured the other plate 22. The legs 24 terminate, at the other end portions thereof, in a pair of hand-grasp portions 30. In connection with the tong parts 24, 26, 28, and 30, I have illustrated conventionally hand-operated tongs for manual opening and manual closing and with the requirement of maintaining the closing pressure to maintain the closed position. If desired, the more expensive type of tongs, which remain closed after being closed, and which are commonly sold under the trade name of "VISE GRIPS," may be employed, if desired, in place of the more simple tongs illustrated in the drawings.

When the tongs are moved to open position, the plates 20 and 22 separate and the jaws therebetween will receive a side wall of a box 10 as is illustrated in FIGS. 1 and 5. The plates 20 and 22 are each provided with a plurality of paired openings 32, 34, 36, and 38, and the holes in each pair in a plate 20 are aligned with those in the plate 22 so that a pair of pins 40 may be slidingly disposed in a selected pair of holes 32, 34, 36, or 38. As appears in FIG. 6, there is clearance between pins 40 and holes 32, 34, 36, or 38, as holes 32, so a loose sliding fit is provided between such pins 40 and any of the holes 32, 34, 36, or 38. As the plates 20 and 22 are carried by jaws 28, which are carried by legs 24, which in turn are pivoted together by pivot means 26, the plates 20 and 22 move in arcuate paths about pin means 26 as a center. When the pins 40 are straight and the holes 32, 34, 36, or 38 are parallel therewith, there must be some clearance between the pins 40 and a hole 32, 34, 36, or 38 carrying such pins to prevent wedge locking of the pins in the holes. However, the clearance may be very small as it is only necessary to move the plates 20 or 22 a small distance toward or away from each other to engage or release a wall of a box 10. The sliding pin fit permits jaws 28 to be readily opened and closed by hand manipulation of the hand-grasp portion 30. The pins 40 are held against displacement by stop means at each end portion thereof, as cotter pins 41.

A typical placement of pairs of holes 32, 34, 36, and 38 is illustrated in connection with FIG. 4 wherein the centers of the holes of the pair 38 are apart crosswise 2⅛ inches and are rearward of the front edge 42 of the plate 20 by three-fourths inch; centers of the holes of the pair 36 are apart seven-eighths inch and rearward of edge 42 by five-eighths inch. Centers of holes of the pair 34 are apart 1½ inches and are rearward of the edge 42 by one-half inch; and the centers of holes of the pair 32 are apart 2½ inches and rearward of the edge 42 by three-eighths inch. The arrangement as to the spacing apart of the holes of the various pairs is for convenience in arranging the same in a relatively narrow width pattern as 2½ inches while the distance rearward of the edge 42 is for allowance of a wall to be later formed of a definite thickness. If the holes 32, 34, 36, and 38 have a diameter of 1/4 inch, then 1/8 inch must be deducted from the distances rearward of the said holes from said edge 42 and such distances will thus allow, respectively, for five-eighths inch, one-half inch, three-eighths inch, and one-fourth inch thickness of wall. While other distances may be allowed, and thus the distances are merely illustrative, distances rearward of edge 42 are in connection with FIG. 4 of the drawings in the interest of a clearer illustration.

One of the plates 20 or 22, as the plate 22, slidingly mounts a measuring rod 44 and a desired adjustment of said rod 44 is permitted by wing nut 46, which is loosened to permit sliding of rod 44 to a desired adjusted amount, and then said wing nut 46 is tightened to maintain such adjustment.

Assuming a wall having a thickness of one-fourth inch will be installed later, then two pins 40 will be inserted in aligned pairs of holes 32 in plates 20 and 22 (as shown) and the pins 40 will be held against displacement by cotter pins 41. Also, the wing nut 46 is loosened and an amount of rod 44 is extended from the bottom of the plate 22 (i.e., from the subfloor 8 below and supporting floor plate 12) to a selected amount as desired, such as 18 inches. Then a side wall of an electrical box is inserted between plates 20 and 22 until the forward surface edge 16 of said box 10 abuts the pins 40. Then the handgrasp portions 30 are moved toward each other and held, thus grasping the edge of the box 10 between the jaws formed by the plates 20 and 22. The tongs and the parts held thereby are moved into place (i.e., one side or the other) relative to a stud 14 by having the enlarged front area 21 of the jaw 20, or the enlarged front area 23 of jaw 22, touch the surface 18 of stud 14 and having the lower end of the rod 44 touch the subfloor upper surface 8 below floor plate 12. By enlarging the areas 21 or 23 on jaws 20 or 22, tongs of minimum weight are provided having maximum contact with a stud surface. Then the fastening means, such as nails, are driven through the holes in the box 10 and into the stud 14. After the box is secured in place, or its final position positively determined, the tongs are released from the box 10.

It will now be obvious that I have provided a jig for holding a box, as an electrical junction box 10, in a selected position for mounting on a stud 14 comprising plates 20 and 22 mounted for movement toward and away from each other, as by mounting the same on tongs 24, 26, 28, 30. Also, preferably, each plate or jaw 20 or 22 has an enlarged front area 21 or 23 for engaging a surface of a stud. Such plates 20 and 22 so mounted and when separated provide a jaw opening into which a side wall of a box 10 may be inserted and when together, they will engage such a wall of a box 10. Stop means are illustrated by a pair of pins 40 which determine the extent of insertion of the forward edge portion 16 of the box 10 in the said jaw opening. The said pins 40 in determining the extent of insertion, do so in cooperation with the various pairs of holes 32, 34, 36, and 38 which are aligned in the plates 20 and 22. The tongs 24, 26, 28, 30 provide hand operated means connected with the plates 20 and 22 for moving the plates 20 and 22 away from each other to open the jaws. As said pins 40 are slidingly mounted in pairs of holes 32, 34, 36, or 38, they do not interfere with the movement of the plates 20 and 22 toward and away from each other and at the same time the said plates determine forward projection of the edge portion 16 of the box 10 into the jaws between plates 20 and 22. The pins 40 are retained against displacement by cotter pins 41. By using two pins 40 and a pair of holes, such as 32, 34, 36, or 38, the side walls of a box 10 will be aligned with the plates 20 and 22 and thus square with the stud 14 when the forward edge 21 of the plate 20 is contacted with the front surface 18 of the stud 14. The box 10 may be mounted at a desired elevation by loosening of wing nut 46 and moving measuring rod 44 a desired distance. Then, at the same time that the edge of plate 20 or 22 touches the surface 18 of the stud 14, the rod 44 may measure upwardly a desired distance from the floor or subfloor. In adjusting the rod 44, it is moved in a plane parallel with the jaw openings between the plates 20 and 22.

Obviously, changes may be made in the forms, dimensions, and arrangements of the parts of my invention without departing from the principle thereof, the above setting forth only preferred forms of embodiment of my invention.

I claim:

1. A jig for holding an electrical junction box in a selected position for mounting on a stud, comprising a pair of plates mounted for movement toward and away from each other and when separated, providing a jaw opening into which a wall of such box may be inserted, and when together, engaging such a wall, each of said plates having an opening aligned with an opening in the other plate; stop means carried by said plates comprising a removable pin means mounted in said aligned openings determining the extent of projection of such a wall into such jaw openings; and hand operated means connected with said plates for moving the same toward and away from each other.

2. The combination of claim 1, wherein said pin is freely slidable in said openings and pin stop means are provided at the end portions of said pin means for retaining said pin means against displacement.

3. The combination of claim 2 wherein said pin stop means comprises a cotter pin.

4. The combination of claim 1, wherein said pin means comprises a pair of pin means and each of said plates is provided with a pair of openings aligned with a pair of openings in the other plate for receiving said pins in said aligned openings, the said openings being each aligned inwardly of said jaw opening to provide the same extent of projection of such sidewall of a box into said jaw openings.

5. The combination of claim 4, wherein the plates are provided with sets of pairs of openings, and two pins may be inserted, one in each member of a selected pair of such openings.